United States Patent

[11] 3,608,524

[72] Inventor Thomas M. Waltz
   Stamford, Conn.
[21] Appl. No. 844,263
[22] Filed July 24, 1969
[45] Patented Sept. 28, 1971
[73] Assignee Wands, Inc.
   Stamford, Conn.

[54] SOUND-ACTUATED ANIMAL-TRAINING DEVICE
   15 Claims, 5 Drawing Figs.
[52] U.S. Cl. .................................................. 119/29,
                                                                119/1, 231/2
[51] Int. Cl. ....................................................... A01k 15/00
[50] Field of Search ........................................... 119/29,
                                                                130; 231/2

[56] References Cited
   UNITED STATES PATENTS
   987,345    3/1911   Cogswell .................... 119/29 X
   2,023,950 12/1935  Carter ......................... 119/29
   2,510,337  6/1950   Franklin ....................... 119/29 X
   2,703,344  3/1955   Anderson ..................... 179/107
   2,741,224  4/1956   Putnay ......................... 119/29
   2,800,104  7/1957   Cameron et al. ............. 119/29
   2,996,043  8/1961   Pettingill ...................... 119/29
   3,505,979  4/1970   Rosswag ....................... 119/110

OTHER REFERENCES
   Outdoor Life Publication Oct. 1964 Selected Excerps Copy 119/29

*Primary Examiner*—Aldrich F. Medbery
*Attorney*—Albert W. Scribner

ABSTRACT: A light, compact training device arranged to be worn by a dog or the like and including a pair of electrodes which are adapted to be held in electrical contact with the animal being trained and which have a relatively low energy series of pulses applied thereto in response to a predetermined minimum noise made by the animal; there being a means provided for limiting the maximum amount of energy that may be applied across said electrodes during a given series of said pulses.

PATENTED SEP 28 1971 3,608,524
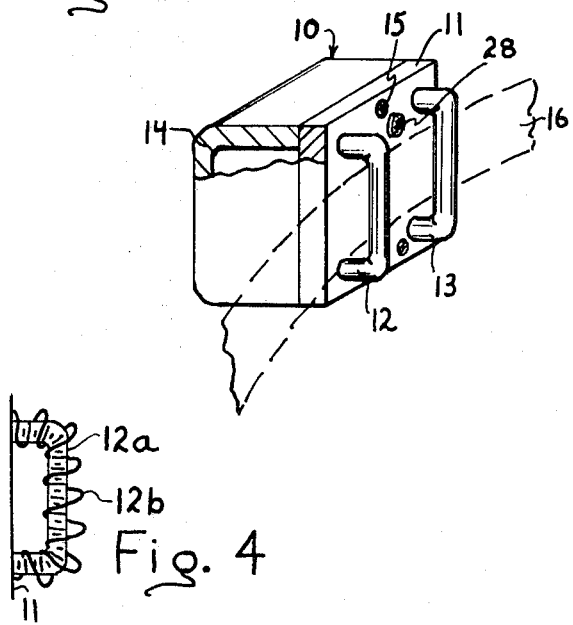
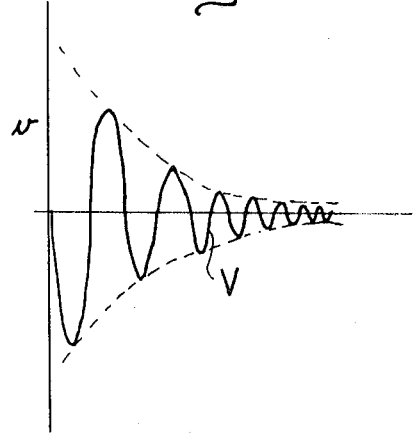
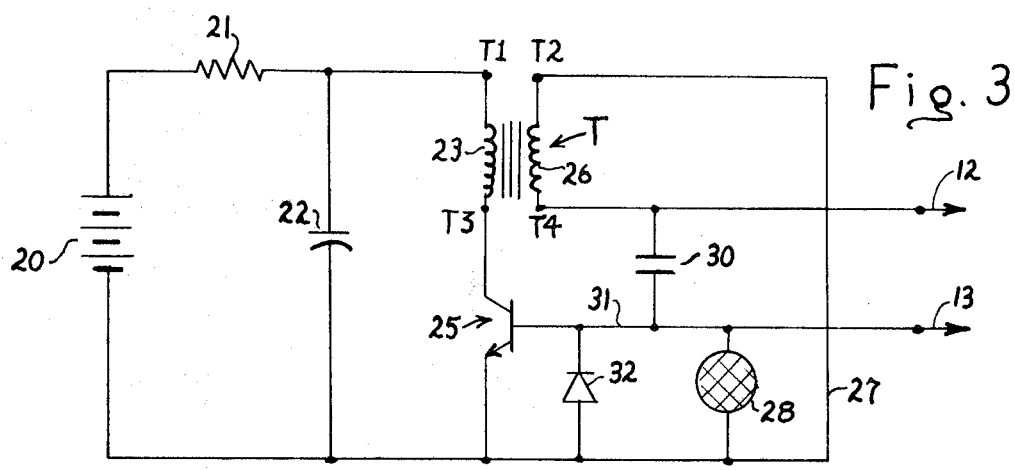
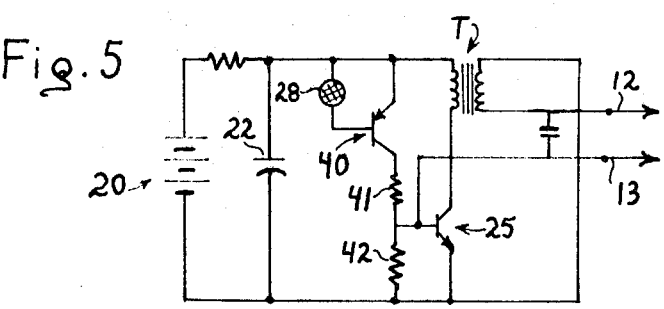
Inventor
THOMAS M. WALTZ
By
Albert W. Scribner
ATTORNEY

SOUND-ACTUATED ANIMAL-TRAINING DEVICE

This invention relates to a novel electrically operated device for training animals. More particularly, the instant invention relates to an improved practical device for controllably training dogs to stop barking.

In many general and special situations, it is desirable to have some means to prevent individual dogs, or groups of dogs, from barking excessively. For example, at kennels one dog's barking tends to stimulate the other dogs to bark and this contagion is often objectionable not only as respects the welfare of the animals themselves, but also to the personnel in the immediate surroundings. Similar problems have been encountered in research centers where many dogs are housed in close proximity, such difficulty having led to a common surgical practice of removing the animal's noise-making organs. This latter action, of course, is objectionable in that it is an irreversible procedure and incidently, additionally requires considerable time and funds. Further, individual dog owners also often wish to train their pets to diminish the extent of barking done, either at certain times during the day or night or at all times.

Prior attempts to provide an effective bark-restraining apparatus for dogs have not been practical and have resulted in complex, cumbersome and even inhumane devices that, in some cases, had no effective means to limit the punishment inflicted on the dog; these prior devices further being excessively large and weighty so as to be not only a burden to the animal carrying such, but also bothersome to the animal custodian who had to complete the cumbersome harnessing and unharnessing of the animal.

A primary object of the present invention is to provide a safe humane device for readily training an animal not to make loud noises.

Another object of the invention is provide a compact, low-cost animal-training device that is small and lightweight enough to be readily attached to and worn by the animal.

A further object of the invention is to provide a novel animal-training device having a pair of electrodes across which may be applied no greater than a predetermined maximum amount of energy in response to a predetermined minimum noise made by the animal.

A still further object of the invention is to provide a safe, efficient, lightweight training device for dogs which may be contained in very small plastic housing and which may be very conveniently secured to a dog collar.

Still another object of the invention is to provide an improved low-cost animal-training device wherein a DC-powered pulse-generating means is provided in conjunction with a pair of electrodes so that relatively low energy AC pulses may be applied across said electrodes.

Another object of the invention is to provide a novel animal-training device wherein a burst of electrical pulses of a predetermined relatively low maximum energy may be applied to an electrode means that is in contact with the animal to be trained.

Other objects of the invention will become apparent as the disclosure progresses. In the drawings:

FIG. 1 is a perspective view illustrating the structural aspects of the instant invention.

FIG. 2 is a circuit diagram illustrating the electrical means for applying the pulsating voltage across the electrodes illustrated in FIG. 1.

FIG. 3 is a sketch illustrating the nature of the burst of pulses that are applied to the electrodes of the instant device.

FIG. 4 is a fragmentary side view illustrating an alternate electrode construction.

FIG. 5 is as circuit diagram for an alternate embodiment of the instant invention.

Referring to FIG. 1, the instant apparatus includes a housing 10 comprising a plastic mounting member 11 to which are secured two laterally aligned and spaced U-shaped metal electrodes 12 and 13 and on which is compactly mounted the various electrical components that form the circuit that will be described below in connection with FIG. 3. A plastic boxlike cover member 14 is sealingly secured to the mounting plate or member 11 by means of suitable screws such as 15 or the like whereby said electrical components may be enclosed in a substantially sealed chamber and may thus be essentially isolated and protected from most of the usual environmental conditions. The dog's collar, strap or harness 16 may be easily threaded through the two apertures effectively defined by the U-shaped electrodes 12 and 13 and the adjacent face of the mounting plate or member 11 and thus, the unit can be quickly and easily attached to and detached from the dog to be trained, no further connections etc. being required.

Referring now to FIG. 3, an entirely self-contained electrical means is shown for applying to the electrodes 12 and 13 a predetermined low-energy burst of AC pulses in response to a predetermined minimum barking noise made by the dog. This circuit includes a battery 20 and a series-connected current-limiting resistor 21 which are connected across a storage capacitor or condenser 22. Connected across this storage condenser are the primary coil 23 of a step-up or voltage-amplifying transformer T and a series-connected switching means 25, the latter being constituted by a suitable gain element such as a transistor. The terminal T2 of the transformer secondary coil 26 is connected to the electrode 13 via line 27 and a microphone 28 while the terminal T4 of said secondary coil is connected to electrode 12. A feedback capacitor 30 is effectively connected between said electrodes and the electrode 13 is connected via line 31 to the base of transistor 25. A protective diode 32 is preferably provided as shown for the base circuit of said transistor.

For the purposes of illustration, the above noted circuit elements may be constituted as follows:

| | | |
|---|---|---|
| Battery 20 | | 22.5 volts |
| Burgess Y15 | | |
| | Condenser 22 | 50 MFD |
| | | 25 volts |
| | | Mallory MT50E25 |
| | Resistor 21 | 33,000 Ohms |
| | | 0.25 watts |
| | Transformer T | UTC |
| | | SO-4 |
| | Transistor 25 | Motorola 2N4922 |
| | Capacitor 30 | 390 pf, 1000v |
| | Microphone 28 | 1000 ohms, Telex, RTX-04 |

The microphone 28 may be designed to be responsive only to acoustical signals above a predetermined minimum level so that a burst of pulses are applied to the electrodes only when the dog barks louder than a set minimum level of sound intensity.

The capacitor 30 is chosen so as to resonate with the transformer T to give maximum output. In that the full electrode potential is taken across capacitor 30, such thus gives the circuit a very wide tolerance to output loads since the resonant frequency band is very broad for the transformer. This is an essential part of the circuit since the output load at the electrodes will vary widely due to weather, skin condition and type of animal, tightness of the collar, etc. The storage capacitor 22 is selected so that the full discharge energy thereof may be quantitatively limited as desired so as not to injure the dog being trained when the said burst of low-energy pulses is applied across said electrodes.

It will be understood that the above specifications for the electrical components are illustrative only and are not to be construed as limiting.

In FIG. 4, there is illustrated an alternate construction for the metal electrodes 12 and 13. Here, the electrode 12a has a threaded exterior surface and/or is provided with a helical coil spring 12b which is disposed over the electrode. In this type arrangement, a more consistent improved electrical contact with the dog is possible.

In the operation of the above described circuit, there is normally existent a low inoperative noise level during which the microphone 28 will maintain the transistor 25 in an effective "off" or nonconducting state so that the capacitor 22 can thus be gradually charged to the voltage level of battery 20. When the dog to which the instant device is attached barks and the resultant noise intensity is above a predetermined level or datum (this level being determined by the said effective gain for the microphone 28) said noise will cause microphone 28 to allow a small current to flow in the base circuit of the transistor 25 whereby the latter begins to conduct so that a larger current then flows through the primary coil 23 of the transformer T and the transistor emitter and collector. The transformer terminal T3 thus goes negative causing the terminal T4 of the transformer secondary coil to go positive. Under these conditions, feedback capacitor 30 feeds a small portion of this positive voltage back to the transistor base and the increase in base current causes a corresponding increase in current flow through the transformer primary coil and the transistor emitter and collector. The currents thus continue to build up until the transistor 25 is fully "on" and the full voltage of the capacitor 22 appears across said primary coil of the transformer. During this current buildup, a relatively high positive voltage pulse will be applied across electrodes 12 and 13. When the full capacitance voltage appears across said primary coil no further increase in current is possible and the voltage at said transformer terminal T4 begins to go negative. This negative going voltage is conducted by the feedback capacitor 30 to the transistor base thereby reducing the base current which in turn causes the voltage at transformer terminal T3 to begin to go positive thus increasing the negative going voltage at said terminal T4. This action continues until the transistor 25 is turned completely "off."During this progressive suppression of the current-flow through the said primary coil 23 a relatively high negative voltage pulse will be applied across said electrodes 12 and 13. During each such cutoff cycle, the transistor base is prevented from going more negative than either the reverse breakdown voltage of the base to emitter, or the forward breakdown voltage of the diode 32 where the latter is used to protect the transistor. After the transistor is thus cut off and the voltage at terminal T4 is negative, said T4 voltage then begins to go positive since it must return to the same voltage as T2 when there is no current flow in the primary coil 23. This positive going voltage at terminal T4 is transmitted through feedback capacitor 30 to the transistor base thus causing the transistor to again be turned "on" and thus the progressive current buildup and cutoff cycle repeats. In this manner, the transistor 25, the transformer T and the capacitor 30 set up continuous automatic oscillation; the frequency thereof primarily depending on the inductance of the transformer, the size of the capacitor 30 and the gain of transistor 25. As the circuit thus oscillates a corresponding series of AC pulses, as illustrated in FIG. 2, is thereby applied across the said electrodes 12 and 13. As this oscillation continues, the current required by the primary coil 23 of the transformer is larger than the current that can be supplied by the battery 20 through the resistor 21; hence, the energy for the oscillations is progressively drained from the capacitor 22 which is thereby discharged in the generation of a burst of said AC pulses. When the voltage across capacitor 22 reaches a lower limit, determined by the gain of transistor 25 and the operative characteristics of the transformer T and the feedback capacitor 30, the circuit stops oscillating and a small current then flows from battery 20 through resistor 21 into capacitor 22 so as to recharge the latter; this recharging takes place in approximately 5 seconds when using the circuit components listed above. Once started, said burst of pulses will automatically continue independent of any operation of said microphone 28 until the capacitor 22 is effectively discharged. Thereafter, the capacitor 22 may again be discharged so as to apply another burst of electrical pulses to said electrodes in response to the triggering action of the microphone 28 in picking up the next effective barking noise made by the dog wearing the instant device. As previously indicated, the maximum energy applied to the electrodes is limited by the proper selection and/or adjustment of the capacitance for the condenser 22 so as to avoid any injury to the dog.

The instant device is thus operative to inflict a controlled, limited and tolerable punishment to the dog each time it barks loudly and thus over a period of time, the dog gradually will reduce the amount of loud barking it does, not only while wearing the device but also after the device is removed. One embodiment of the instant training device which has been found to be safe, compact and very practical used the above-listed components and developed an output voltage across said electrodes of 1,000 v. (r.m.s.) at about 3,000 hertz and at approximately 4.0 watts. The structural size of the housing 10 here was made so as to measure approximately 1½ inch ×1½ inch ×2 inches and weighed about 0.3 of a pound.

FIG. 5 illustrates a modified embodiment of the instant device. Here, in order to increase the noise sensitivity of the unit, the microphone 28 is connected so as to control a PNP germanium transistor 40 of low power and leakage which in turn, together with the resistors 41 and 42, control the said silicon transistor 25. In this more sensitive version, however, the other operating characteristics of the circuit are the same as that described above.

I claim:

1. An animal-training device adapted to be worn, and held in contact with the animal to be trained:
   comprising a pair of animal-shocking electrodes supportable by a suitable animal harness means;
   a power source including a capacitor,
   an oscillator circuit electrically interconnected between said power source and said electrodes for applying to said electrodes a burst of electrical pulses for each discharge of said capacitor; said oscillator circuit being connected across said capacitor and including
   a step-up transformer,
   a switching means for controlling the flow of current through the primary coil of said transformer, and
   an electrical feedback connection between a secondary coil of said transformer and said switching means so that said capacitor when charged may be discharged through said oscillator circuit to thereby generate said burst of pulses at the secondary coil of said transformer and thus at said electrodes; and
   trigger means for applying a control signal to said switching means so as to initiate the operation of said oscillator circuit and the discharge of said capacitor, said burst of pulses once started by said control signal being automatically continued by operation of said oscillator circuit and independent of the operation of said trigger means during the discharge of said capacitor.

2. Apparatus as defined by claim 1 wherein said power source includes a battery that is connected across said capacitor.

3. Apparatus as defined by claim 1 wherein said trigger means includes an acoustically sensitive device for initiating operation of said oscillator circuit in response to an acoustical signal.

4. Apparatus as defined by claim 1 wherein said switching means includes a transistor having a base that is adapted to be controlled by the secondary coil of said transformer and by the output of said trigger means.

5. Apparatus as defined by claim 1 wherein said electrical feedback connection includes a capacitor that is connected across said electrodes.

6. Apparatus as defined by claim 4; additionally comprising means for preventing high negative swings of the base of said transistor.

7. Apparatus as defined by claim 1 wherein said electrodes include a helical surface.

8. Apparatus as defined by claim 1 wherein said trigger means includes a second switching means for controlling the initiation of operation of said first mentioned switching means.

9. An animal-training device adapted to be worn, and held in contact with the animal to be trained; comprising:
- a pair of animal-shocking electrodes supportable by a suitable animal harness means;
- a power source including a capacitor;
- an oscillator circuit electrically interconnected between said power source and said electrodes for generating and applying to said electrodes a burst of electrical pulses for each discharge of said capacitor;
- said oscillator circuit being connected across said capacitor and including a feedback control for automatically intermittently discharging said capacitor so as to thereby generate said burst of pulses at said electrodes; and
- trigger means for applying a control signal to said oscillator circuit so as to initiate the intermittent discharge of said capacitor, said burst of pulses once started by the action of said control signal continuing automatically by operation of said oscillator circuit and independent of any simultaneous operation of said trigger means occuring during the said intermittent discharge of said capacitor.

10. Apparatus as defined by claim 9 wherein said oscillator circuit includes a step-up transformer, a transistor for controlling the flow of current through the primary coil of said transformer, and an electrical feedback connection between the secondary coil of said transformer and the base of said transistor so that said capacitor when charged may be discharged so as to generate said burst of pulses, and wherein said trigger means includes a microphone that is operative in response to noises made by the animal that is being trained to initiate operation of said transistor so as to start the automatic generation of said burst of pulses by said oscillator circuit.

11. Apparatus as defined by claim 10 wherein said feedback control includes a capacitor, and wherein said power source includes a battery and a resistance connected between said battery and said first mentioned capacitor.

12. A training device for animals: comprising
- an animal attachable housing;
- a pair of electrodes mounted on said housing;
- electrical pulse generating means including a storage capacitor mounted in said housing for applying a burst of pulses to said electrodes;
- an animal sound activated trigger means for initiating operation of said pulse generating means;
- said electrodes extending externally of said housing, the portions thereof external of said housing being laterally aligned and spaced apart and each defining a substantially U-shaped configuration so as to receive an animal carried strap which holds said electrodes against the animal to be trained.

13. Apparatus as defined by claim 12 wherein said housing comprises a plastic baseplates to which said electrodes are mounted, and a plastic cover secured to said baseplate.

14. Apparatus as defined by claim 13 wherein said electrodes include an helical surface which is adapted to contact the animal to be trained.

15. Apparatus as defined by claim 9 wherein said feedback path is connected across said electrodes.